Patented Mar. 3, 1953

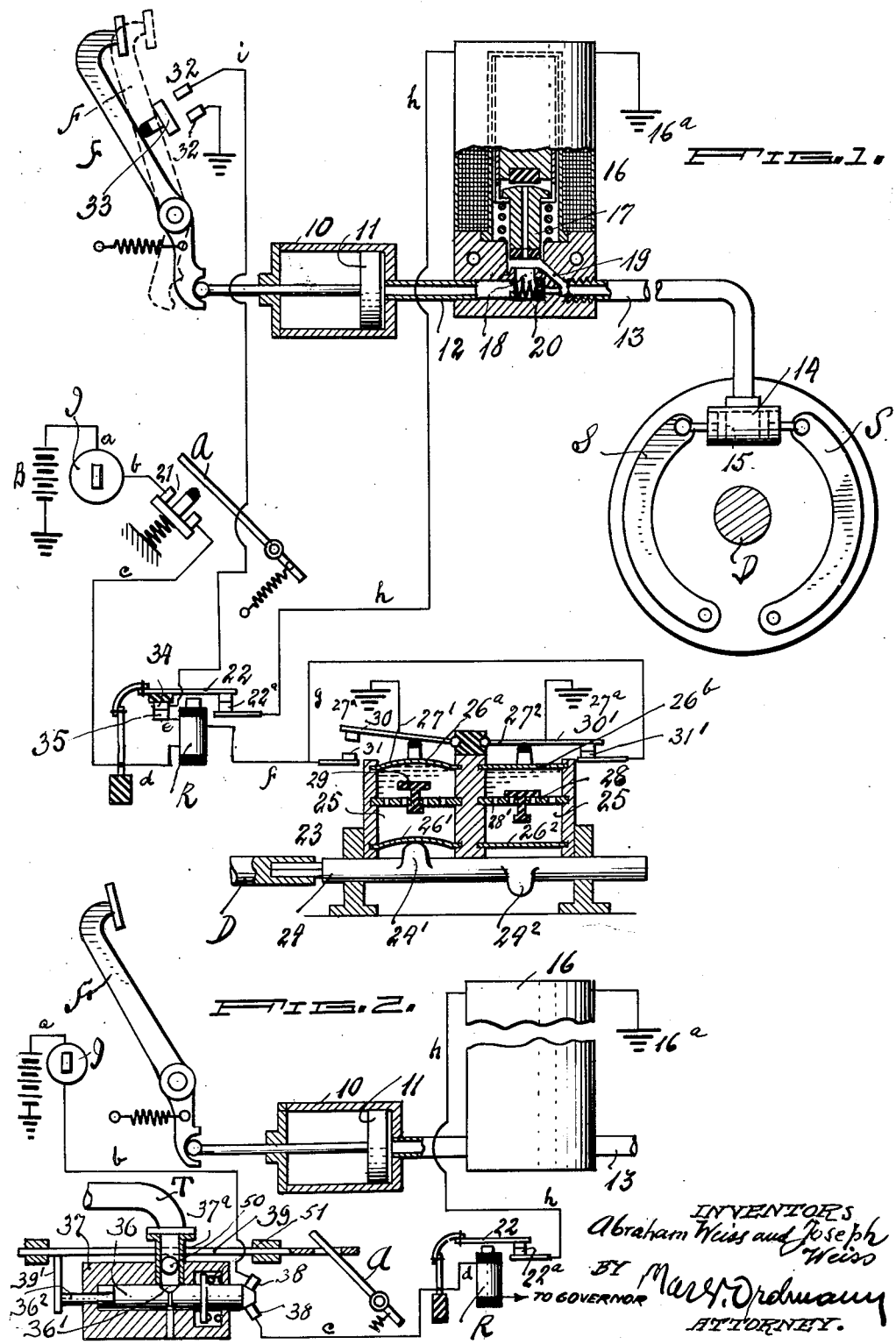

2,630,195

UNITED STATES PATENT OFFICE 2,630,195

MEANS FOR CONTROLLING THE BRAKES OF MOTOR VEHICLES

Abraham Weiss and Joseph Weiss, New York, N. Y.; said Joseph Weiss, administrator of said Abraham Weiss, deceased, assignor to Joseph Weiss individually Application December 11, 1946, Serial No. 715,580

22 Claims. (Cl. 192—3)

The present invention relates to motor vehicles and specifically to means for controlling the brakes thereof.

Its main object is to provide effective means whereby the tendency of the vehicle to roll back or forward upon the release of the brake pedal and before the accelerator is depressed will be eliminated.

Another object is to provide effective means whereby the brakes will be automatically locked in braking position when the vehicle comes to a full stop, while the ignition is on and the accelerator pedal released, and be automatically released when the accelerator pedal is depressed.

Another object is to provide means whereby the brakes will be retained in locked position when the engine has stalled and the accelerator is released.

Still another object is to provide means for preventing the accidental release of the brakes when the vehicle, through a push or from some other cause is moved from its rest position.

Still another object is to provide an electric circuit automatically controlled by a switch responsive to vibration.

With these and other objects in view, that will be apparent from the detailed description of our invention, the latter consists in the novel construction, arrangement and combination of parts that will be hereinafter more fully specified and defined in the appended claims.

In the accompanying drawings constituting part of the specification and in which similar reference characters denote corresponding parts:

Fig. 1 is a diagrammatic view of our new brake control system employing electric means which include a relay and a delay action governor controlling the electric circuits of said means, and Fig. 2 is a similar view of a modification in which the electric means also include a suction controlled locking means for the electric switch.

Referring first to the embodiment shown in Fig. 1, let S denote the fluid pressure actuated brake shoes, F the brake pedal and A the accelerator pedal. The brake pedal F is operatively associated with a plunger 11 working in the master fluid pressure cylinder 10. The latter, through conduits 12, 13 is connected to the fluid pressure cylinder 14 which by plungers 15 actuate the brake shoes S. Between the conduits 12 and 13 we provide a suitable automatic valve 17. In the present embodiment we use electric means including a solenoid 16 grounded at 16a for controlling said valve 17. The construction of said solenoid actuated valve in itself is well known. When, as will be hereinafter shown, the solenoid is energized, the ports 18, 19 of said valve are closed by said valve causing the brake fluid to be trapped in the brake cylinder 14 and thereby the locking of the brake shoes in braking position. 20 denotes a pressure relief valve adapted to control the amount of pressure to be trapped in the brake shoe cylinder 14.

The electric means for actuating the solenoid 16 include an electric switch 21 adapted to be normally closed, but opened when the accelerator pedal A is depressed. The said electric means also include an electric relay R and a governor controlled switch mechanism 23.

In the present embodiment, the governor is of a delayed action type and comprises at least two adjacent fluid receptacles 25, 25, the top and bottom of each of which are formed by yielding membranes, such as diaphragms $26^1$, $26^2$, $26^a$, $26^b$, respectively, or any other suitable movable means. Each receptacle is partitioned off into superposed compartments communicating with one another through a valve 29, the seat 28 of which has bleeding orifices $28^1$. The top diaphragm $26^a$, $26^b$ are adapted to actuate electric switches, comprising contact arms 30, $30^1$ cooperating with contact points 31, $31^1$ which switches when closed are adapted to close the circuit through the relay and vice versa.

The bottom diaphragms $26^1$, $26^2$, are adapted to be actuated by longitudinally and radially displaced cam elements 24, $24^2$, provided on a rotary shaft 24 which is suitably coupled to the main driving shaft D or any driven part of the vehicle. Thus with the vehicle in motion, the shaft 24, will be rotated so that its cam elements $24^1$, $24^2$ alternately will expand the diaphragms $26^1$, $26^2$ and thereby cause the fluid to be compressed through the valves 29 into the upper compartments which then will cause the outer expansion of the corresponding top diaphragms $26^a$, $26^b$ alternately lifting contact arms 30, $30^1$ from contact with contact points 31, $31^1$ respectively.

I denotes the ignition switch and B the battery.

The mode of operation is as follows:

Assuming that on the depression of the brake pedal F the vehicle has come to a full stop, while the ignition is on and the accelerator pedal A is released. As a result thereof, the solenoid actuated valve 17 is automatically closed as will be presently described, and the brake fluid is trapped in the brake cylinder 14, locking the brake shoes in braking position.

The automatic closing of the solenoid valve is effected as follows:

When the accelerator pedal A is released, the switch 21 is closed, as shown, so that the electric current flows from the battery B, through the closed ignition switch I, the closed switch 21 to the coil of the relay R and thence to the stationary switch points 31, 31¹ of the governor actuated switches.

While, as we have assumed, the vehicle had come to a full stop, one of the pair of governor actuated switches will be closed. In the present instance, the right hand switch 25¹, 26¹ is shown closed so that the battery circuit through the coil of the relay flowing along the wires $a, b, c, d, e, f$, and $g$, is closed. Hence, the relay will be energized attracting the contact arm 22 into closing position with stationary contact piece 22ª. This will close another branch of the battery circuit flowing along wires $a, b, c$, closed switch 22, 22ª, and wire $h$ to the solenoid 16, energizing the latter with the result already stated.

Now, assuming that after the vehicle has come to a full stop, the vehicle through some cause, is moved. That will cause the cam shaft to rotate and operate the governor, in a manner which would open the circuit through the relay R with the result that the brakes will accidentally become unlocked. To prevent the unlocking of the brakes before the vehicle is ready to be started, we provide a second ground for the relay.

In the present example, this second ground for the relay circuit is effected automatically through a switch composed of stationary contact points 32, 32 and a movable contact piece 33 to be actuated by the brake pedal F, so as to close said switch when the brake pedal is in released position (Fig. 1). One of the stationary contact points, say 32, is grounded and the other contact point by wire $i$ is connected to a contact point 34 provided on and insulated from the contact arm 22, and adapted when contact arm 22 is attracted to make contact with contact point 33 which is connected by wire $e1$ to the coil of the relay R. Thus, if from some cause the vehicle is accidentally moved from its rest position, tending to open the relay circuit, the second ground above mentioned will, upon the release of brake pedal F maintain the relay circuit closed. When not using the switch 32, the relay R can be omitted by connecting wire $c$ directly to contact 31, and by connecting contact arm 30 directly to the solenoid 16, instead of the ground; with this circuit, switch 32 can be interposed into the circuit to by-pass the governor by connecting wire $i$ into circuit wire $c$, and through switch 32 directly to the solenoid instead of to ground.

If, when travelling over an icy or slippery road, the brake pedal should be too heavily depressed, the brakes might become locked and the unlocking of the brakes by the depression of the accelerator pedal would cause the operator to lose control of the vehicle.

This can be prevented by using the solenoid actuated valve to control only some of the brakes of a vehicle, as for instance, one pair of brakes of a four brake vehicle, and by associating the governor with a moving part not affected by said valve control.

With such arrangement, when the brake pedal is too heavily depressed, all brakes will be effectively applied but only the brake or brakes under the valve control will become actually locked through the operation of the solenoid. In such event, to release the locked brake or brakes without depressing the accelerator pedal while the vehicle is skidding or otherwise moving, all the driver has to do is to ease up on the brake pedal. This will have the result that the unlocked brake or brakes will release the moving part which, in its turn through the operation of the governor, will cause the breaking of the circuit operating the solenoid releasing the valve and consequently the locked brake or brakes.

In the modification shown in Fig. 2, the accelerator actuated switch shown in the first modification is replaced by a suction controlled switch 38. The latter is actuated by a movable contact piece 36 slidably borne in a housing 37 and provided with a cavity 36¹ in its periphery. Mounted in and projecting outwardly from said housing 37 is a pipe section 37ª having an air vent (not shown) to the outside atmosphere through the housing 37 whose inner diameter equals the width of the cavity 36¹ and which is connected to a suction tube T leading from the intake manifold (not shown). Movably borne in said pipe section 37ª is an element 50 such as a ball which when there is no suction, will drop by gravity into the cavity 36¹ and lock the contact piece 36 in position closing the switch 38. The contact piece 36 tends to be displaced from the locking position shown, by a suitable spring 51 but will be held in switch closing position when the accelerator pedal A is released, as shown. This, in the present example, may be effected by means of a sliding bar 39 formed at one end with a finger 39¹ adapted to engage a part 36² of the member 36 projecting outwardly from the housing. The opposite end of said sliding bar 39 is adapted to be suitably actuated by the accelerator pedal A, so that when said pedal is in released position the sliding bar 39 will be displaced causing its finger 39¹ to push the contact member into switch closing position, so that its cavity 36¹ comes into alignment with the pipe section 37ª.

In every other respect the device may be identical with that shown in the first modification.

The mode of operation is as follows:

Assuming that while the ignition is on, the vehicle at full stop, the accelerator pedal A released and the brake pedal F depressed. With the switch 38 closed, as heretofore shown, the brakes will be locked in braking position.

While the engine is working suction in the tubes T, 37ª will raise the element 50 from the cavity 36¹ and unlock the contact member 36. And as long as the accelerator is in released position this member 36 will hold the switch 38 closed against the tension of spring 51. But as soon as the accelerator pedal is depressed, the member 36 will be allowed to be displaced longitudinally bringing the cavity out of alignment with the pipe section 37ª.

Assuming now that the engine has stalled. In that case suction in the pipe sections T, 37ª will cease, so that the element 50 will drop down by gravity. Now, when the accelerator pedal A is in released position the member 36 will have its cavity coinciding with the pipe section 37ª, so that the element 50 will be able to enter it and lock the member 36 in switch closing position. As a result thereof the solenoid 16 will be maintained energized and permit the restarting of the vehicle by the depression of the accelerator pedal A without opening the switch 38 and therefore without disenergizing the solenoid 16.

It is quite obvious that various changes may be made in the construction of our brake con-

What we claim is:

1. In a motor vehicle having an accelerator, and brake mechanism, means for actuating said brake mechanism including a valve, electric means for controlling said brake actuating means, said electric means including a solenoid adapted when energized to close said valve and thereby lock brakes of the braking mechanism in braking position, an accelerator actuated switch adapted to be closed when the accelerator is released, a relay which when energized completes the circuit through said valve actuating solenoid, said electric means including a governor responsive to the motion of a driven part of the vehicle which is not effected by operation of said valve to control the circuit through said relay and auxiliary means between said relay and said brake actuating means, to prevent said governor from releasing said brakes before starting the vehicle.

2. In a motor vehicle having an accelerator, and brake mechanism, manual means for actuating said brake mechanism, including a brake pedal, a valve, electric means for controlling said brake actuating means, said electric means, including a solenoid adapted when energized to close said valve and thereby lock brakes of the braking mechanism in braking position, an accelerator controlled switch adapted to be closed when said accelerator is released, a relay which when energized is adapted to complete the circuit through said valve actuating solenoid, electric means for controlling the circuit through said relay, said electric means including a governor responsive to the motion of a driven part of the vehicle and switch mechanism actuated by said governor, and auxiliary electric means between said relay and the said brake actuating means to prevent the governor from releasing the brakes before starting the vehicle.

3. In a motor vehicle according to claim 2 in which said governor comprises a rotary cam member responsive to the motion of a driven part of the vehicle and which member is not affected by the locking of brakes by said valve.

4. In a motor vehicle according to claim 1, in which auxiliary electric means are provided for completing the circuit through said relay, when said governor controlled circuit is broken.

5. In a motor vehicle according to claim 1, in which auxiliary electric means are provided for completing the circuit through said relay, when said governor controlled circuit is broken, said auxiliary means being controlled by said brake actuating means.

6. In a motor vehicle according to claim 1 in which said accelerator controlled switch includes means adapted to maintain said switch in closed position when the engine stalls.

7. In a motor vehicle according to claim 1, in which said accelerator controlled switch includes suction actuated means adapted to maintain said switch in closed position when the engine is stalled.

8. In a motor vehicle according to claim 1 in which said accelerator controlled switch includes a slidable spring urged contact member, movable means associated with said accelerator capable of holding said member in switch closing position when said accelerator is released, and automatic means for locking said member in switch closing position when the engine has stalled.

9. In a motor vehicle according to claim 1, in which said accelerator controlled switch includes a slidable member, movable means associated with said accelerator capable of holding said member in switch closing position when said accelerator is released and gravity actuated means for locking said member in switch closing position when the engine is stalled.

10. In a motor vehicle according to claim 2 in which said governor comprises a rotary member having cam elements and switches adapted to be alternately actuated by the said cam elements, said governor being adapted to control said electric circuit both during forward and reverse drive of the vehicle.

11. In a motor vehicle according to claim 2 in which said governor includes a driven rotary member having at least two longitudinally spaced and radially projecting cam elements and at least two switches adapted to be alternately actuated by said cam elements said governor being adapted to control the electric circuit both during forward and reverse drive of the vehicle.

12. In a motor vehicle according to claim 2 in which said governor comprises a member adapted to be rotated in response to the motion of a driven part of the vehicle, said member having at least two longitudinally and radially displaced cam elements, a pair of compression responsive means each adapted to be actuated by the corresponding cam element, and in which said switch mechanism includes a pair of contact members each adapted to alternately close and open the circuit through said relay, and means for controlling the speed of action of said switches.

13. In a vehicle having wheels and brakes, brake actuating means, means for controlling at least one of said brake actuating means, whereby less than all of said wheels are controlled thereby, said controlling means including an accelerator adapted to be actuated by the operator of the vehicle, and a governor responsive to rotation of at least one of said wheels not controlled by said controlling means, both said accelerator and said governor being adapted to so control said controlled brake actuating means that when said vehicle is stopped the associated brakes will be maintained in operative position by said governor until said accelerator is actuated by the operator.

14. In a vehicle having wheels and brakes, brake actuating means, means for controlling said brake actuating means, whereby less than all of said wheels are controlled thereby, said controlling means including a governor responsive to rotation of at least one of said wheels not controlled by said controlling means and being adapted to hold said controlled brakes in operative position when the vehicle comes to a full stop, and an accelerator operable by the operator of said vehicle for releasing said controlled brakes.

15. In a motor vehicle having wheels and brakes, means for actuating said brakes including a brake pedal, a valve, electric means including an electric circuit and accelerator switch for controlling said brake actuating means, said electric means including a solenoid adapted when actuated to operate said valve and thereby lock at least one of said brakes in braking position, whereby less than all of said wheels are controlled thereby, a governor adapted to be operated from at least one of said wheels not controlled by said electric controlling means and which governor when rotation of all of said wheels ceases will affect the electric circuit actuating said solenoid, and auxiliary electric means associated with said brake pedal for preventing said governor during rotation of said one of said wheels not controlled by said controlling means from releasing said one of said brakes before actuating the accelerator switch to start the vehicle.

16. In a motor vehicle having wheels and brakes, means for actuating said brakes including a brake pedal, a valve adapted to control at least one of the brakes of the vehicle, whereby less than all of said wheels are controlled thereby, electric means for controlling the operation of said valve, said electric means including a solenoid adapted when actuated to operate said valve and thereby lock said one of said brakes, a governor adapted to be operated by at least one of said wheels not controlled by said valve and which governor when rotation of said one of said wheels not controlled by said valve occurs will prevent operation of said solenoid.

17. In a motor vehicle having wheels, brakes, an accelerator, and brake mechanism, means for actuating said brake mechanism including a valve adapted to control at least one of said brakes, whereby less than all of said wheels are controlled thereby, electric means for controlling said valve, said electric means including a solenoid adapted when energized to close said valve and thereby lock said one of said brakes in braking position, an accelerator actuated switch adapted to be closed when the accelerator is released, means responsive to rotation of at least one of said wheels not controlled by said valve and adapted to affect said electric means, and auxiliary means to prevent said responsive means from releasing said valve before actuation of the accelerator.

18. In a motor vehicle, according to claim 17, in which said auxiliary means comprise a brake actuated switch adapted when closed to bypass said responsive means.

19. In a motor vehicle having wheels, brakes, an accelerator, and brake mechanism, manual means for actuating said brake mechanism including a brake pedal, a valve adapted to control at least one of said brakes, whereby less than all of said wheels are controlled thereby, electric means for controlling said brake actuating means, said electric means including a solenoid adapted when energized to close said valve and thereby lock said one of said brakes in braking position, an accelerator controlled switch adapted to be closed when said accelerator is released, a governor responsive to rotation of at least one of said wheels not controlled by said valve and adapted to affect said electric means, and manual means to prevent said governor from unlocking said one of said brakes before starting the vehicle.

20. In a motor vehicle, according to claim 19, in which said manual means comprise a brake pedal actuated switch adapted when closed to bypass said governor and prevent it from releasing said one of said brakes before starting the vehicle.

21. In a motor vehicle having wheels, brakes, an accelerator, and brake mechanism, means for actuating said brake mechanism including a valve adapted to control at least one of said brakes, whereby less than all of said wheels are controlled thereby, electric means for controlling said brake actuating means, said electric means including a solenoid adapted when energized to operate said valve and thereby lock said one of the brakes in braking position, an accelerator switch adapted to be closed when the accelerator is released, and a governor responsive to rotation of at least one of said wheels not controlled by said valve and adapted to effect said electric means.

22. In a motor vehicle according to claim 21, in which said accelerator actuated switch includes means adapted to maintain said switch in closed position when the engine stalls.

ABRAHAM WEISS.
JOSEPH WEISS.

REFERENCES CITED

The following references are of record in the file of this patent:

UNITED STATES PATENTS

| Number | Name | Date |
|---|---|---|
| 1,600,121 | Mazade | Sept. 14, 1926 |
| 1,611,772 | O'Dell | Dec. 21, 1926 |
| 2,028,491 | Barrett et al. | Jan. 21, 1936 |
| 2,235,412 | Weiss et al. | Mar. 18, 1941 |
| 2,262,842 | Goepfrich | Nov. 18, 1941 |
| 2,272,320 | Freeman | Feb. 10, 1942 |
| 2,277,584 | Freeman | Mar. 24, 1942 |
| 2,287,301 | Freeman | June 23, 1942 |
| 2,287,562 | Pennington | June 23, 1942 |
| 2,297,692 | Chambers | Oct. 6, 1942 |
| 2,313,232 | Freeman | Mar. 9, 1943 |
| 2,313,430 | Goepfrich | Mar. 9, 1943 |
| 2,329,156 | Coffey | Sept. 7, 1943 |
| 2,334,611 | Darling | Nov. 16, 1943 |
| 2,345,280 | Morgan et al. | Mar. 28, 1944 |
| 2,414,409 | Goepfrich | Jan. 14, 1947 |
| 2,478,884 | Wisley | Aug. 9, 1949 |